US009449189B1

(12) United States Patent
Harman et al.

(10) Patent No.: US 9,449,189 B1
(45) Date of Patent: Sep. 20, 2016

(54) PROTECTION OF STATE DATA IN COMPUTER SYSTEM CODE

(71) Applicant: International Business Machines Corporation, Armonk, NY (US)

(72) Inventors: David J. Harman, Chandler's Ford (GB); Gary O. Whittingham, Romsey (GB); Mark A. Woolley, Winchester (GB); Andrew Wright, Chandler's Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/930,687

(22) Filed: Nov. 3, 2015

(51) Int. Cl.
*G06F 7/04* (2006.01)
*G06F 21/62* (2013.01)
*G06F 21/60* (2013.01)

(52) U.S. Cl.
CPC ......... *G06F 21/6218* (2013.01); *G06F 21/602* (2013.01)

(58) Field of Classification Search
USPC ...................................................... 726/26, 27
See application file for complete search history.

(56) References Cited

U.S. PATENT DOCUMENTS

| | | | |
|---|---|---|---|
| 6,308,265 B1 * | 10/2001 | Miller | G06F 11/1433 710/10 |
| 7,228,434 B2 | 6/2007 | Zisowski | |
| 7,272,228 B2 | 9/2007 | Atkin et al. | |
| 7,325,252 B2 * | 1/2008 | Bunker | H04L 12/2602 726/23 |
| 7,437,766 B2 * | 10/2008 | Cohen | G06F 9/468 713/164 |
| 7,793,346 B1 * | 9/2010 | Daub | G06F 21/56 713/164 |
| 8,533,851 B2 | 9/2013 | Ginter et al. | |
| 8,538,889 B2 * | 9/2013 | Bhave | G06F 21/105 705/57 |
| 8,918,885 B2 | 12/2014 | McClure et al. | |
| 2003/0037245 A1 * | 2/2003 | Cuenod | G06F 21/125 713/189 |
| 2003/0061497 A1 * | 3/2003 | Zimmer | G06F 21/575 713/189 |
| 2004/0010701 A1 * | 1/2004 | Umebayashi | G06F 21/6227 713/193 |
| 2009/0259794 A1 | 10/2009 | Huber et al. | |
| 2011/0191854 A1 * | 8/2011 | Giakouminakis | G06F 21/00 726/25 |
| 2011/0231936 A1 * | 9/2011 | Williams | G06F 21/577 726/55 |
| 2011/0302657 A1 * | 12/2011 | Ikegami | G06F 21/577 726/25 |
| 2013/0055219 A1 | 2/2013 | Aranguren et al. | |
| 2013/0326234 A1 * | 12/2013 | Murao | H04L 9/3247 713/189 |
| 2014/0082366 A1 * | 3/2014 | Engler | H04L 9/3226 713/176 |
| 2015/0046751 A1 | 2/2015 | Bohling et al. | |

OTHER PUBLICATIONS

IBM: List of IBM Patents or Patent Applications Treated As Related (Appendix P), Mar. 7, 2016, pp. 1-2.
Pending U.S. Appl. No. 15/055,928, filed Feb. 29, 2016, entitled: "Protection of State Data in Computer System Code", pp. 1-26.

* cited by examiner

*Primary Examiner* — Amare F Tabor
(74) *Attorney, Agent, or Firm* — Kamyar Maserrat; Michael A. Petrocelli

(57) ABSTRACT

Method and system are provided for protecting state data of computer system code. The computer system code may be operating system code, subsystem code or application code and the item of state data is not expected to change within the execution of the computer system code. The method includes: creating or modifying an item of state data having a field value and being stored in memory for access by computer system code; registering an item of state data for protection; preserving the field value of the item of state data in a form inaccessible to third party software; validating the field value of the item of state data by comparing a current field value with the preserved field value to determine if the field value has been modified; and, if the field value has been modified, taking appropriate action.

13 Claims, 5 Drawing Sheets

PROTECTION OF STATE DATA IN COMPUTER SYSTEM CODE

BACKGROUND

The present invention relates to the protection of state data in computer system code, and more specifically, to preventing third party software modifying state data.

Items of state data are provided for computer system code and the items of data are intended to remain static in system code after they are populated at startup or during runtime.

It is a common practice for software vendors and original equipment manufacturer (OEM) suppliers to modify the state data used by operating system subsystems. This allows vendor code to be invoked in place of the "official" code provided by the subsystem.

SUMMARY

According to an embodiment of the present invention there is provided a computer-implemented method for protecting state data of computer system code, comprising: creating or modifying an item of state data having a field value and being stored in memory for access by computer system code; registering an item of state data for protection; preserving the field value of the item of state data in a form inaccessible to third party software; validating the field value of the item of state data by comparing a current field value with the preserved field value to determine if the field value has been modified; and, if the field value has been modified, taking appropriate action.

According to a second aspect of the present invention there is provided a system for protecting state data of computer system code, comprising: a processor and a memory configured to provide computer program instructions to the processor to execute the functions of the components; a new data component for creating or modifying an item of state data having a field value and being stored in memory for access by computer system code; a registering component for registering an item of state data for protection; a data preservation component for preserving the field value of the item of state data in a form inaccessible to third party software; a validation component for validating the field value of the item of state data by comparing a current field value with the preserved field value to determine if the field value has been modified; and an action component for, if the field value has been modified, taking appropriate action.

According to a third aspect of the present invention there is provided a computer program product for protecting state data of computer system code, the computer program product comprising a computer readable storage medium having program instructions embodied therewith, the program instructions executable by a processor to cause the processor to: generate (create or modify) an item of state data having a field value and being stored in memory for access by computer system code; register an item of state data for protection; preserve the field value of the item of state data in a form inaccessible to third party software; validate the field value of the item of state data by comparing a current field value with the preserved field value to determine if the field value has been modified; and, if the field value has been modified, take appropriate action.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system preserve items of state data that should remain static in system code after they are populated at startup or during runtime. Validation may then be carried out to ensure that the contents of the items of state data remain unchanged by performing periodic inspections of the data values and comparing these to the preserved items of state data. If modifications are detected, the method and system may report on the changes, undo them if applicable, take appropriate diagnostic action, and/or potentially terminate the system to preserve integrity.

The implementation of this method and system assists in the protection of a system's code from modification. Such modification may be by third party software code, for example, to manage time functions or hooking into and replacing addresses, or by viruses and malware.

Figure 1:
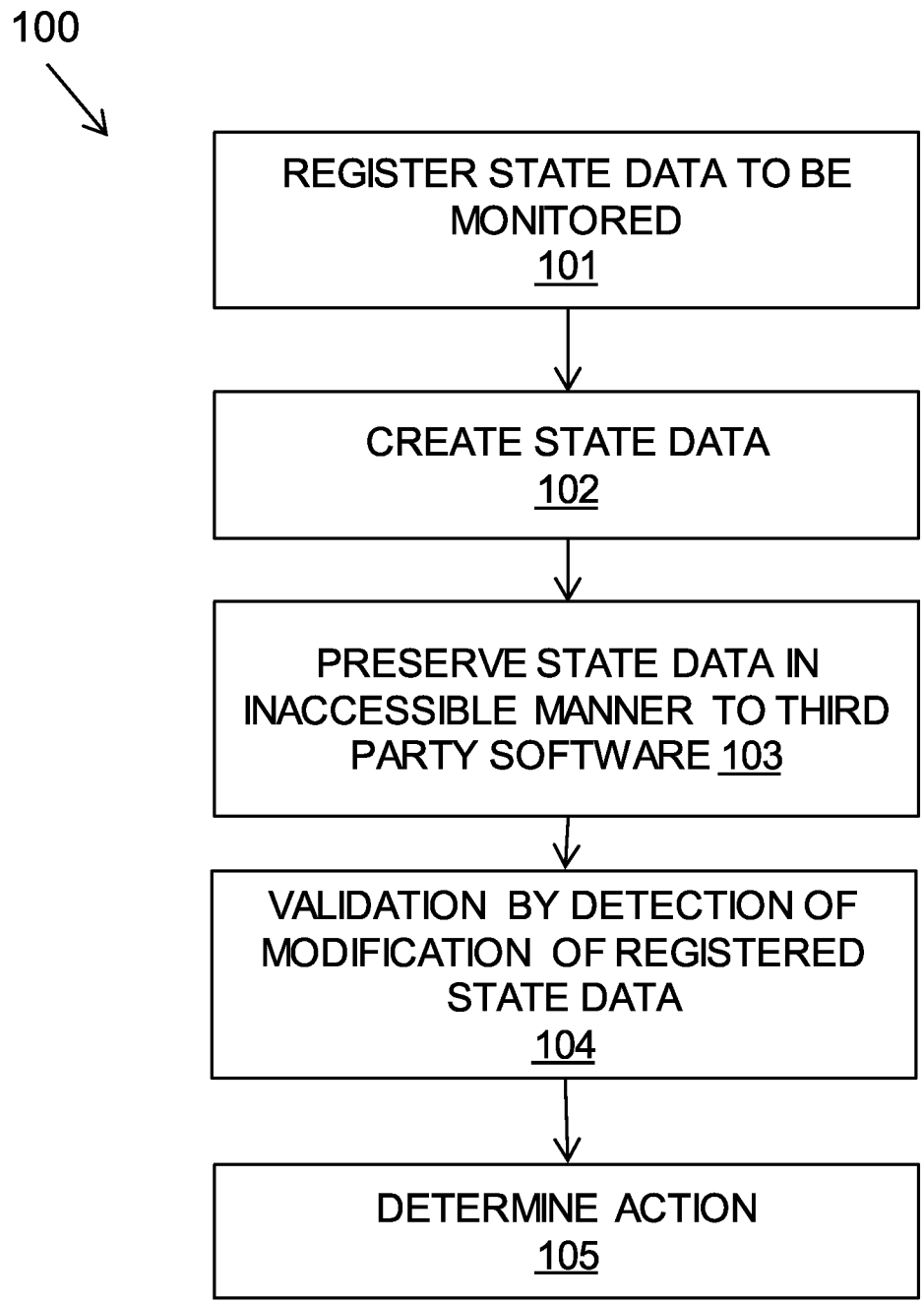
FIG. 1 is a flow diagram of an example embodiment of a method in accordance with the present invention.

Referring to FIG. 1, a flow diagram 100 shows an example embodiment of the described method.

At 101, the described method proposes that specific items of state data of a computer system's code that are not expected to change within the execution of the system be registered. Computer system code may be operating system code, subsystem code, or application code. In this context, references to "system code" or "a system's code" represent computing environments such as operating systems, subsystems, or applications.

At 102, the items of state data may be generated (created or populated) with field values. This may be carried out at initialization of the system code or during runtime. An example of an item of state data may be a field in a data structure that addresses a particular computer program, or a control block that holds information about the computer system. Another example may be a field that contains a hardcoded limiting value of the number of times a particular operation may occur.

If an item of state data is being generated (e.g. created), then the registration 101 may take place after the generation of the item of state data. However, if the item of state data is being changed with newly populated field values during runtime, then the registration, or re-registration may take place later in the method.

At 103, the items of state data with their field values may be preserved in a manner inaccessible to third party software. This may be carried out by taking a snapshot copy of the items of state data and recording the snapshot elsewhere in the system. In another embodiment, the items of state data may be preserved in an encrypted state.

At 104, validation of the items of state data may be carried out periodically or when required by the system code. The validation may detect if the field values of the items of state data have been modified when compared to the preserved values.

At 105, if the field values have been modified, a resultant action to be taken may be determined.

Original equipment manufacture (OEM) and vendor code referred to as third party software is known to deliberately modify specific fields within system storage (for example, address pointers) to improve the operation of, or provide an advantage to, the third party software. The original system code may then not function correctly as the field values of the items of state data should not alter during the execution of the system. The described method preserves these values, validates their content at runtime (not during offline dump processing), and takes appropriate actions accordingly.

If a control block's data is preserved at the time it is instantiated, the system is able to validate that it had not been modified from that point onwards. The preservation of the snapshot of how the control blocks should look may be stored in a manner that prevents the copy from being changed by third party software or malware.

The preservation may be achieved by means of hardening the copy to some inaccessible, non-memory destination, such as a dedicated file or dataset which the system alone had access to, or which was unavailable for access by other code unless specifically configured to do so by the security administrator. Another alternative would be to encrypt or scramble the snapshot so that it could be maintained in memory but not be easily updated by third party code to change it in line with the target control blocks.

The items of state data may include a wide range of possible forms; some examples include: data structures, addresses, flags, limiting values, Boolean values, pointers, arrays, constant values, character strings, hash values, binary data, etc.

In one example, a vector control block such as the z/OS communications vector table (CVT), status indicators such as the CICS Common Service Area (CSA) and Task Control Area (TCA), etc. (z/OS and CICS are trade marks of International Business Machines Corporation) have many pointers to other control blocks and items of state data that are set up during system or task startup and which persist as immutable values for the duration of the execution. These are vulnerable to being modified by vendor or OEM code packages to redirect runtime execution to third party code. As the described method preserves the control block data at the time it was instantiated, the system is able to validate that it had not been modified from that point onwards.

It is envisaged that the majority of the data of interest for preservation would be established early on during the system initialization. As such, the snapshot of the data to a secured location would take place at that time. However, it is possible that state data may be generated (created, or set up) during normal system execution, after initialization has completed. As such, the method may allow for items of state data of interest to be established and registered as such during normal execution, as well as in system startup.

Having generated and preserved the snapshot of the valid control block state data and address, detection validation of the contents could be performed in a number of ways. It could be driven every-so-often, as part of a subsystem dispatch cycle for example, or as part of internal trace recording or housekeeping operations. Alternatively, it could be validated as and when the fields themselves are referred to, before used as a target for a branch (for addresses) or as input to a decision or calculation (for state data). Another approach could be to validate the contents on a time-sliced basis, irrespective of what function is being executed at the time.

Once a change to state data of address fields within a control block is detected, the method may perform one or more of several actions, dependent on what the change was. It would be necessary to determine what actions to take, contingent on whether some alterations may be expected to take place (if say a particular piece of vendor or OEM code is being used on the system and the operator is satisfied its behavior of modifying fields is acceptable or not). This may require a reference to a database of acceptable deviations from taking further action, established when installing the vendor code. Assuming such an acceptance deviation is not in place, the method may perform one or more of several actions listed below:

Alert the operator that the change had been detected. This may be implementation-specific and may, for example, be achieved by: a console message, screen message, alert being issued, exception trace event being recorded, memory dump being captured, monitoring data being generated, etc.;

Leave the modified state data as is, i.e. not attempt to undo the change. This may be acceptable in certain cases; for example, where a known vendor or OEM product made such modifications, and the operator of the system was aware of this and accepted it on their system;

Modify the data back to its original state from the snapshot information held by the system. This may be achieved by updating the entire control block, or done on a piecemeal basis for individual fields or addresses as they were detected as being changed; or Terminate the system if such a detected modification was deemed invalid or represented a security breach or exposure.

Figure 2A:
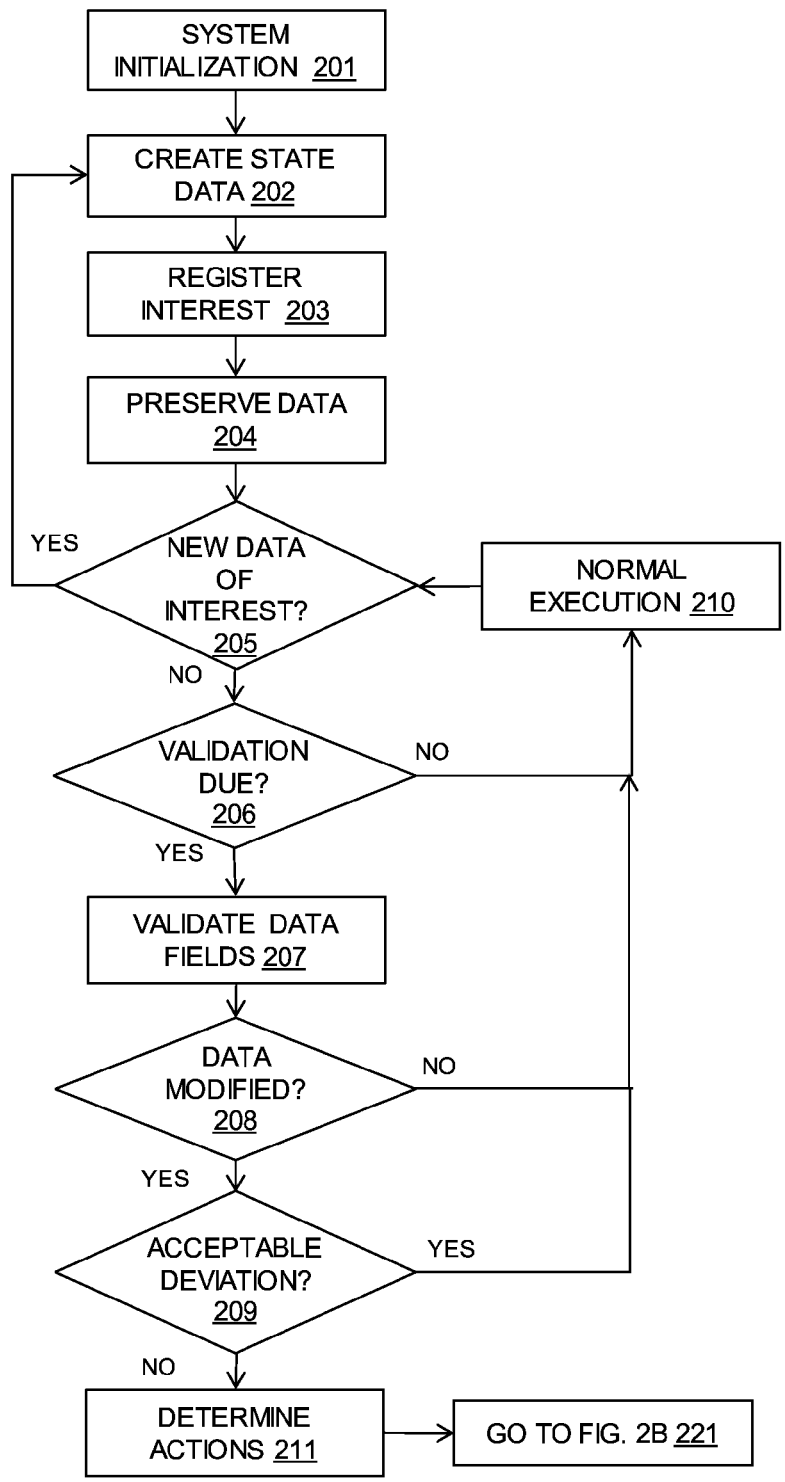
FIGS. 2A and 2B are flow diagrams of a further example embodiment of a method in accordance with the present invention.
Figure 2B:
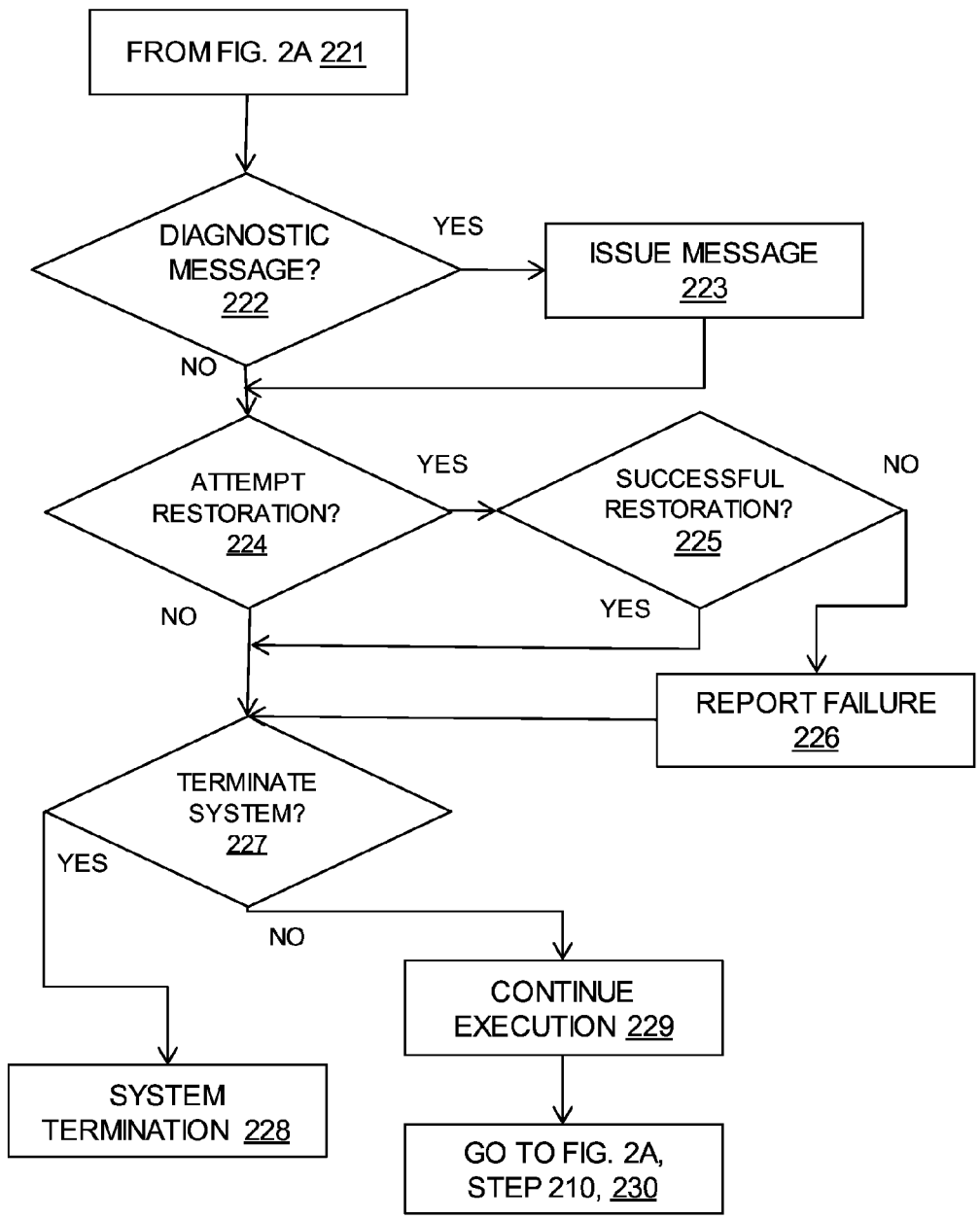

Referring to FIGS. 2A and 2B, a more detailed flow diagram of an example embodiment of the described method is shown.

A system initialization 201 may be carried out. The system may be a computer operating system or computer subsystem or application that runs code within the operating system.

State data may be generated (step 202) and may be registered (step 203) for monitoring. The field values of the state data may be preserved (step 204). As discussed above, this may be in one of various methods which makes the preserved state data inaccessible to third party code.

At 205 it may be determined if there is new data of interest. If so, the method may loop to generate new state data (step 202).

If there is no new data of interest, it may then be determined if validation is due (step 206). This may occur at various times including periodically, when state data is required, or at other times. If validation is not due, the method may carry on normal execution (step 210) and check if there is new data of interest (step 205).

If validation is due (step 206), the data fields of the preserved state data may be validated (step 207) by comparing their current values to the preserved values. This may include accessing the preserved state data from its stored location and decrypting it, if it has been stored in an encrypted form.

It may be determined (step 208) if the data has been modified. If it has not been modified, the method may carry on normal execution (step 210) and check if there is new data of interest (step 205).

If it has been modified (step 208), the method may optionally determine if it is an acceptable deviation (step 209) from the preserved state data. In some embodiments, no deviation may be considered acceptable; however, in other embodiments, there may be some variation allowed. If the deviation is acceptable, the method may carry on normal execution (step 210) and check if there is new data of interest (step 205). If the deviation is not acceptable, or if no deviation is acceptable, the method may determine (step 211) appropriate action to take. At this step, the flow diagram continues from FIG. 2A (step 221) to FIG. 2B (step 221).

Some appropriate actions that may be taken are shown in FIG. 2B. A diagnostic message may be sent (step 222) and if this option is selected a message may be issued (step 223).

An attempt at restoration (step 224) of the field values of the state data may be carried out. If this is attempted, it may be determined (step 225) if the restoration is successful. If it is not successful, a failure may be reported (step 226).

It may be decided to terminate the system's execution (step 227). If this is decided, the system may terminate (step 228). However, if it is not decided to terminate the system's execution, the execution may continue (step 229) and the method may return (step 230) to step 210 of FIG. 2A.

The implementation of this method assists in the protection of the execution of the system. It avoids modification of the system's state data by viruses or malware, or from unexpected changes from vendor or OEM code. This improves the overall security of the system as a result by preventing changes to state information that could be detrimental to system stability and performance. The method may also help reduce problems and problem investigation times by avoiding situations where such changes lead to outages or system failures. In avoiding these, it would be of assistance to maintaining customer satisfaction and helping maintain savings in support and service costs.

Third party code may target state data to provide the ability to manage time functions in a running system, and does this by modifying the saved entry point address of the official time management logic with a pointer to the third party product that handles time management instead. This allows the third party code to be driven when time-related operations are to be performed.

Time management operations is one example where this behavior can be seen, but there are many others such as hooks into security code, into code to perform system monitoring or statistics, into accessing databases and external resources, etc.

The practice of "hooking into" and replacing addresses and state information like this can lead to many problems for customers. For example, it can introduce issues with reentrancy and thread safety. The official code path may be written to reentrant standards and be able to be executed in parallel under multiple threads of execution, whereas the hooked-in code may not. This results in undefined behavior, such as abends (abnormal ends), program checks, etc. These problems can lead to system outages and downtime for customers, and have to be investigated by product support teams. There is a cost in terms of time and lost revenue to the customer, and service costs to companies in having their support organizations debug the problem. It can be the case that different members of the support teams end up diagnosing the same underlying problem at the same time, and not be aware of this due to differing failure symptoms.

A means of identifying such behavior by vendor code is useful to assist customers in understanding what changes are being made to their system by applying vendor code, and to assist support organizations in identifying changes to official operating environments, which are often very hard to spot. In addition, the potential to restrict or prevent such changes is of use in certain customer environments.

Figure 3:
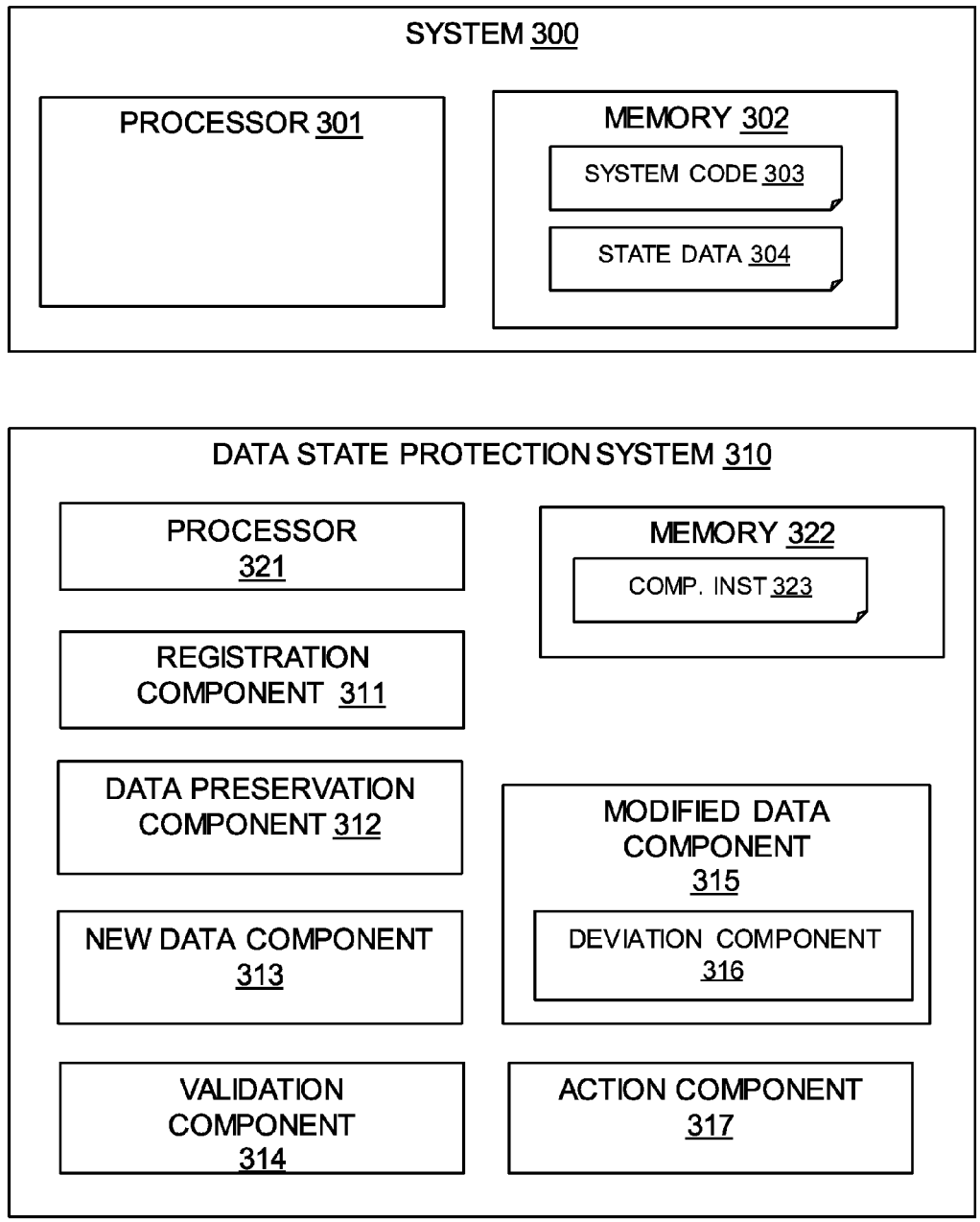
FIG. 3 is a block diagram of an example embodiment of a system in accordance with the present invention.

Referring to FIG. 3, illustrates an example embodiment of the described system. A monitored system 300 may include at least one processor 301, a hardware module, or a circuit for executing computer instructions. Memory 302 may be configured to provide computer instructions including system code 303 to the at least one processor 301 to carry out functionality. Memory 302 may also include stored state data 304 for referencing by the system code 303.

A data state protection system 310 may be provided for carrying out the functionality of the described method. The data state protection system 310 may include at least one processor 321 for executing the functions of the described components which may be software units executing on the at least one processor. Memory 322 may be configured to provide computer instructions 323 to the at least one processor 321 to carry out the functionality of the components.

The data state protection system 310 may include the following components. A registration component 311 may be provided for registering items of state data 304 which are to be preserved and monitored for validity. A data preservation component 312 may be provided for preserving field values of registered items of state data 304. This may include storing a copy of the items of state data in a storage location inaccessible to third party software and/or encrypting the preserved field values. A new data component 313 may monitor for new items of state data of interest which may be required to be registered by the registration component 311.

A validation component 314 may validate registered items of state data at required times by comparing current field values with preserved field values of the item of state data. A modified data component 315 may determine if the field values have been modified and a deviation component 316 may determine if the modification is within acceptable or prescribed limits. An action component 317 may be provided which may be activated if an unacceptable modification to an item of state data is determined.

Figure 4:
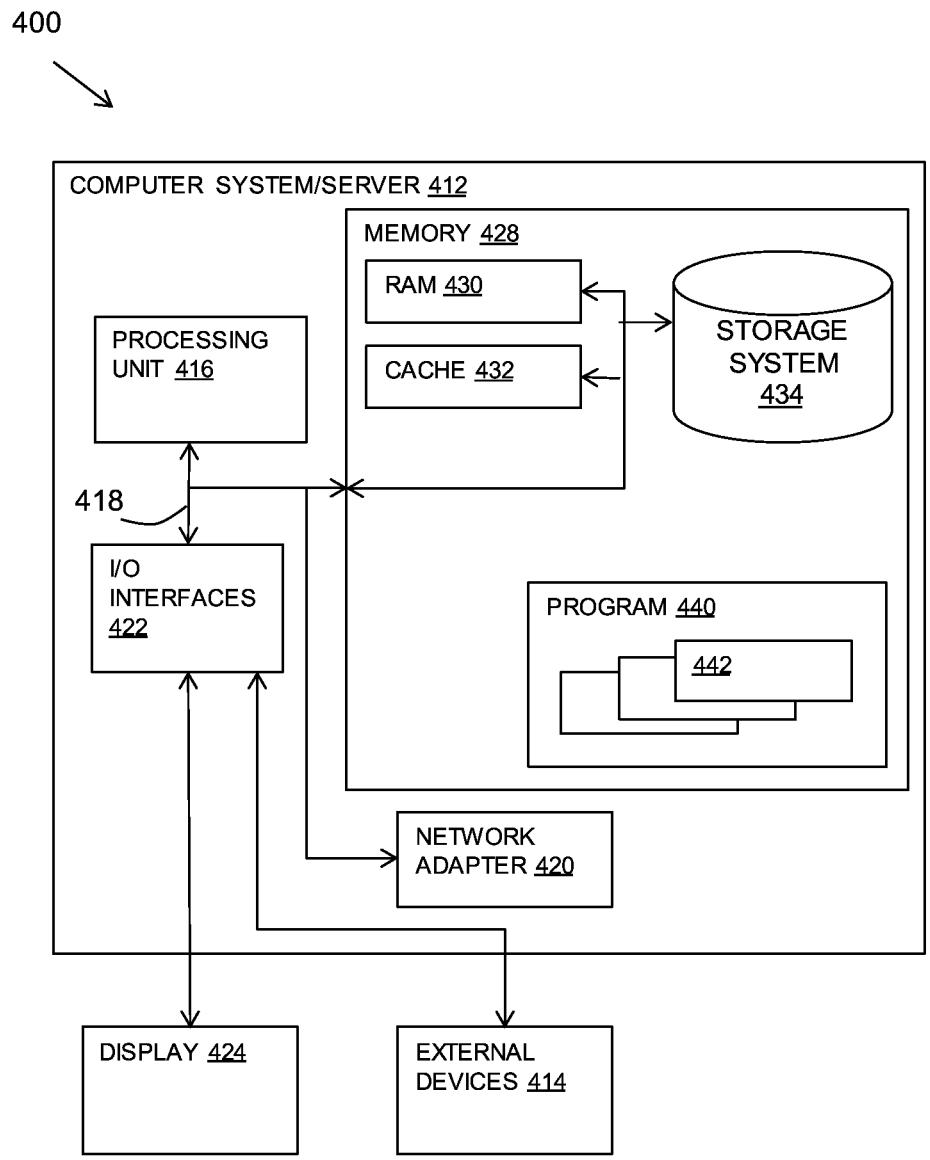
FIG. 4 is a block diagram of an embodiment of a computer system in which the present invention may be implemented.

Referring now to FIG. 4, a schematic of an example of a system 400 in the form of a computer system or server is shown.

A computer system or server 412 may be operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

In FIG. 4, a computer system/server 412 is shown in the form of a general-purpose computing device. The components of the computer system/server 412 may include, but are not limited to, one or more processors or processing units 416, a system memory 428, and a bus 418 that couples various system components including system memory 428 to processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, system memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for protecting state data of computer system code, comprising:
    generating an item of state data having a field value and being stored in memory for access by computer system code;
    registering the item of state data for protection, wherein registering the item of state data for protection is carried out at system runtime when an item of state data is modified;
    preserving the field value of the item of state data in a form inaccessible to third party software by taking a snapshot copy of the item of the state data, and wherein preserving the field value encrypts the field value before storing;
    validating the field value of the item of state data by comparing a current field value with the preserved field value to determine when the field value has been modified; and
    in response to the field value being modified, initiating an action, the action including one or more of: alerting an operator, keeping the modified field value, returning the field value back to the preserved field value, or terminating the system,
    wherein validating the field value is carried out at one or more of the following times: periodically, as part of a dispatch cycle, as part of internal trace recording, as a housekeeping operation, when the fields are referred to.

2. The method as claimed in claim 1, wherein registering the item of state data for protection is carried out at system initialization when the item of state data is created.

3. The method as claimed in claim 1, wherein preserving the field value hardens a copy of the field value to a non-memory destination which the computer system code only has access to.

4. The method as claimed in claim 1, wherein validating the field value applies an acceptable deviation between a current field value and the preserved field value.

5. The method as claimed in claim 1, wherein preserving the field value of the item of state data includes preserving multiple field values of multiple items of state data in a single preserving operation.

6. The method as claimed in claim 1, wherein generating includes modifying or creating, or both.

7. A computer system for protecting state data of computer system code, the computer system comprising:
    one or more computer processors;
    one or more computer-readable storage media;

program instructions stored on the computer-readable storage media for execution by at least one of the one or more processors, the program instructions comprising:
- instructions to generate an item of state data having a field value and being stored in memory for access by computer system code;
- instructions to register the item of state data for protection, wherein registering the item of state data for protection is carried out at system runtime when an item of state data is modified;
- instructions to preserve the field value of the item of state data in a form inaccessible to third party software by taking a snapshot copy of the item of the state data, and wherein preserving the field value encrypts the field value before storing;
- instructions to validate the field value of the item of state data by comparing a current field value with the preserved field value to determine when the field value has been modified; and
- in response to the field value being modified, instructions to initiate an action, the action including one or more of: alerting an operator, keeping the modified field value, returning the field value back to the preserved field value, or terminating the system,
wherein validating the field value is carried out at one or more of the following times: periodically, as part of a dispatch cycle, as part of internal trace recording, as a housekeeping operation, when the fields are referred to.

8. The system as claimed in claim 7, wherein the instructions to register the item of state data for protection is implemented at system initialization when the item of state data is created.

9. The system as claimed in claim 7, wherein the instructions to preserve the field values hardens a copy of the field value to a non-memory destination which the system computer code only has access to.

10. The system as claimed in claim 7, wherein the instructions to validate the field values applies an acceptable deviation between the current field value and the preserved field value.

11. The system as claimed in claim 7, wherein the computer system code is operating system code, subsystem code or application code and the item of state data is not expected to change within the execution of the computer system code.

12. The system as claimed in claim 7, wherein generating includes modifying or creating, or both.

13. A computer program product for protecting state data of computer system code, comprising a computer-readable storage medium having program code embodied therewith, the program code executable by a processor of a computer to perform a method comprising:
- generating an item of state data having a field value and being stored in memory for access by computer system code;
- registering the item of state data for protection, wherein registering the item of state data for protection is carried out at system runtime when an item of state data is modified;
- preserving the field value of the item of state data in a form inaccessible to third party software by taking a snapshot copy of the item of the state data, and wherein preserving the field value encrypts the field value before storing;
- validating the field value of the item of state data by comparing a current field value with the preserved field value to determine when the field value has been modified; and
- in response to the field value being modified, initiating an action, the action including one or more of: alerting an operator, keeping the modified field value, returning the field value back to the preserved field value, or terminating the system, wherein validating the field value is carried out at one or more of the following times: periodically, as part of a dispatch cycle, as part of internal trace recording, as a housekeeping operation, when the fields are referred to.

* * * * *